US011963081B2

(12) United States Patent
Kanno et al.

(10) Patent No.: US 11,963,081 B2
(45) Date of Patent: Apr. 16, 2024

(54) REPORT PROCESSING APPARATUS, REPORT PROCESSING METHOD, PROGRAM, AND RECORDING MEDIUM

(71) Applicant: NEC Corporation, Tokyo (JP)

(72) Inventors: Tetsuya Kanno, Tokyo (JP); Satoru Kaneda, Tokyo (JP); Hideaki Tsuoka, Tokyo (JP); Midori Itonaga, Tokyo (JP); Kazunari Tomishige, Tokyo (JP)

(73) Assignee: NEC CORPORATION, Tokyo (JP)

( * ) Notice: Subject to any disclaimer, the term of this patent is extended or adjusted under 35 U.S.C. 154(b) by 264 days.

(21) Appl. No.: 17/294,485

(22) PCT Filed: Nov. 20, 2019

(86) PCT No.: PCT/JP2019/045469
§ 371 (c)(1),
(2) Date: May 17, 2021

(87) PCT Pub. No.: WO2020/105681
PCT Pub. Date: May 28, 2020

(65) Prior Publication Data
US 2022/0022020 A1 Jan. 20, 2022

(30) Foreign Application Priority Data
Nov. 21, 2018 (JP) .................. 2018-218528

(51) Int. Cl.
*H04W 4/90* (2018.01)
*G08B 25/00* (2006.01)
(Continued)

(52) U.S. Cl.
CPC ............ *H04W 4/90* (2018.02); *G08B 25/005* (2013.01); *G08B 25/08* (2013.01); *H04M 11/04* (2013.01); *H04W 4/029* (2018.02)

(58) Field of Classification Search
CPC ...... H04W 4/90; H04W 4/029; G08B 25/005; G08B 25/08; H04M 11/04
See application file for complete search history.

(56) References Cited

U.S. PATENT DOCUMENTS 6,233,445 B1 * 5/2001 Boltz ...................... H04W 4/90
455/521
10,922,547 B1 * 2/2021 Siminoff .............. H04N 23/661
(Continued)

FOREIGN PATENT DOCUMENTS

| JP | 2003271504 A | 9/2003 |
| JP | 2005078302 A | 3/2005 |

(Continued)

OTHER PUBLICATIONS

Japanese Office Action for JP Application No. 2020-557594 dated Sep. 13, 2022 with English Translation.
(Continued)

*Primary Examiner* — Dai Phuong

(57) ABSTRACT

In order to enable appropriate reporting of information related to an event to be reported when the event occurs, a report processing apparatus 100 includes: an information obtaining unit 131 configured to obtain first report information reported from a terminal apparatus with respect to a target event; a determination unit 133 configured to determine one or more report destinations associated with the target event from a plurality of candidate report destinations (report destination apparatus 401 to 405) based on the first report information; and a communication processing unit 135 configured to transmit information related to the first report information to the one or more report destinations associated with the first report information.

9 Claims, 12 Drawing Sheets

(51) Int. Cl.
*G08B 25/08* (2006.01)
*H04M 11/04* (2006.01)
*H04W 4/029* (2018.01)

(56) References Cited

U.S. PATENT DOCUMENTS

| | | | |
|---|---|---|---|
| 2012/0252399 A1* | 10/2012 | Saito | G08B 25/10 455/404.2 |
| 2013/0222133 A1 | 8/2013 | Schultz et al. | |
| 2014/0118140 A1 | 5/2014 | Amis | |
| 2015/0213708 A1* | 7/2015 | Barzangi | G08B 25/10 455/404.2 |
| 2017/0142567 A1* | 5/2017 | Yamine | H04W 4/90 |
| 2018/0000385 A1* | 1/2018 | Heaton | G08B 25/016 |
| 2019/0156646 A1* | 5/2019 | Richey | G08B 21/10 |
| 2019/0364249 A1 | 11/2019 | Yamagaki et al. | |

FOREIGN PATENT DOCUMENTS

| | | |
|---|---|---|
| JP | 2010-268144 A | 11/2010 |
| JP | 2015-215766 A | 12/2015 |
| JP | 2016-057842 A | 4/2016 |
| JP | 2016170571 A | 9/2016 |
| JP | 2018-037813 A | 3/2018 |
| JP | 2018-137683 A | 8/2018 |
| WO | 2018116485 A1 | 6/2018 |

OTHER PUBLICATIONS

International Search Report of PCT Application No. PCT/JP2019/045469 dated Jan. 7, 2020.
English translation of Written opinion for PCT Application No. PCT/JP2019/045469 dated Jan. 7, 2020.
3rd Generation Partnership Project, "Technical Specification Group Services and System Aspects, Service requirements for Machine-Type Communications (MTC), Stage 1 (Release 13)", 3GPP TS 22.368 V13.2.0 (Dec. 2016), pp. 1-24.
Extended European Search Report for EP Application No. EP19886374.8 dated Dec. 20, 2021.
Japanese Office Action for JP Application No. 2020-557594 dated Jun. 7, 2022 with English Translation.
JP Office Action for JP Application No. 2020-557594, dated Jan. 24, 2023 with English Translation.

* cited by examiner

| SERVICE AREA | MTC APPLICATIONS |
|---|---|
| SECURITY | SURVEILLANCE SYSTEMS |
| | BACKUP FOR LANDLINE |
| | CONTROL OF PHYSICAL ACCESS (E.G. TO BUILDINGS) |
| | CAR/DRIVER SECURITY |
| TRACKING & TRACING | FLEET MANAGEMENT |
| | ORDER MANAGEMENT |
| | TELEMATICS INSURANCE: PAY AS YOU DRIVE (PAYD) |
| | ASSET TRACKING |
| | NAVIGATION |
| | TRAFFIC INFORMATION |
| | ROAD TOLLING |
| | ROAD TRAFFIC OPTIMISATION/STEERING |
| PAYMENT | POINT OF SALES (POS) INFORMATION MANAGEMENT |
| | VENDING MACHINES |
| | GAMING MACHINES |
| HEALTH | MONITORING VITAL SIGNS |
| | SUPPORTING THE AGED OR HANDICAPPED |
| | WEB ACCESS TELEMEDICINE POINTS |
| | REMOTE DIAGNOSTICS |
| REMOTE MAINTENANCE/CONTROL | SENSORS |
| | LIGHTING |
| | PUMPS |
| | VALVES |
| | ELEVATOR CONTROL |
| | VENDING MACHINE CONTROL |
| | VEHICLE DIAGNOSTICS |
| METERING | POWER |
| | GAS |
| | WATER |
| | HEATING |
| | GRID CONTROL |
| | INDUSTRIAL METERING |
| CONSUMER DEVICES | DIGITAL PHOTO FRAME |
| | DIGITAL CAMERA |
| | EBOOK |

REPORT PROCESSING APPARATUS, REPORT PROCESSING METHOD, PROGRAM, AND RECORDING MEDIUM

This application is a National Stage Entry of PCT/JP2019/045469 filed on Nov. 20, 2019, which claims priority from Japanese Patent Application 2018-218528 filed on Nov. 21, 2018, the contents of all of which are incorporated herein by reference, in their entirety.

BACKGROUND

Technical Field

The present invention relates to a report processing apparatus, a report processing method, a program, and a recording medium that process report information from a terminal apparatus.

Background Art

In case of occurrence of emergency such as an incident and a disaster, a first discoverer and its victims need to perform reporting to proper authorities such as the police and the fire department. It is desired that people who cope with the emergency can precisely understand the situation of the site. For example, PTL 1 discloses a method for supporting a countermeasure to emergency situations, the method including: selecting, based on a reported location which is a location at which a mobile phone used for making the emergency reporting is located, a fixed point observation camera that can capture a neighborhood area of the reported location; and presenting image information of the selected fixed point observation camera to people who cope with the emergency.

CITATION LIST

Patent Literature

[PTL 1] JP 2005-078302 A

SUMMARY

Technical Problem

Unfortunately, however, in a report system assumed in the method for supporting a countermeasure to emergency situations described above or the like, a reporter needs to judge an appropriate report destination according to contents, an occurrence location, and the like of an event to be reported such as the emergency, and perform reporting through a call using a mobile phone or the like. Thus, the reporter may fail to perform reporting to a proper report destination or may fail to promptly perform reporting.

An example object of the present invention is to provide a report processing apparatus, a report processing method, a program, and a recording medium that enable appropriate reporting of information related to an event to be reported when the event occurs.

Solution to Problem

According to one example aspect of the present invention, a report processing apparatus includes: an information obtaining unit configured to obtain first report information reported from a terminal apparatus with respect to a target event; a determination unit configured to determine one or more report destinations associated with the target event from a plurality of candidate report destinations based on the first report information; and a communication processing unit configured to transmit information related to the first report information to the one or more report destinations associated with the first report information.

According to one example aspect of the present invention, a report processing method includes: obtaining first report information reported from a terminal apparatus with respect to a target event; determining one or more report destinations associated with the target event from a plurality of candidate report destinations based on the first report information; and transmitting information related to the first report information to the one or more report destinations associated with the first report information.

According to one example aspect of the present invention, a program causes a processor to execute: obtaining first report information reported from a terminal apparatus with respect to a target event; determining one or more report destinations associated with the target event from a plurality of candidate report destinations based on the first report information; and transmitting information related to the first report information to the one or more report destinations associated with the first report information.

According to one example aspect of the present invention, a recording medium is a non-transitory computer readable recording medium storing a program that causes a processor to execute: obtaining first report information reported from a terminal apparatus with respect to a target event; determining one or more report destinations associated with the target event from a plurality of candidate report destinations based on the first report information; and transmitting information related to the first report information to the one or more report destinations associated with the first report information.

Advantageous Effects of Invention

According to the present invention, when an event to be reported occurs, information related to the event can be appropriately reported. Note that, according to the present invention, instead of or together with the above effects, other effects may be exerted.

BRIEF DESCRIPTION OF THE DRAWINGS

FIG. 12 is a diagram illustrating some examples of MTC applications.

DESCRIPTION OF THE EXAMPLE EMBODIMENTS

Figure 1:
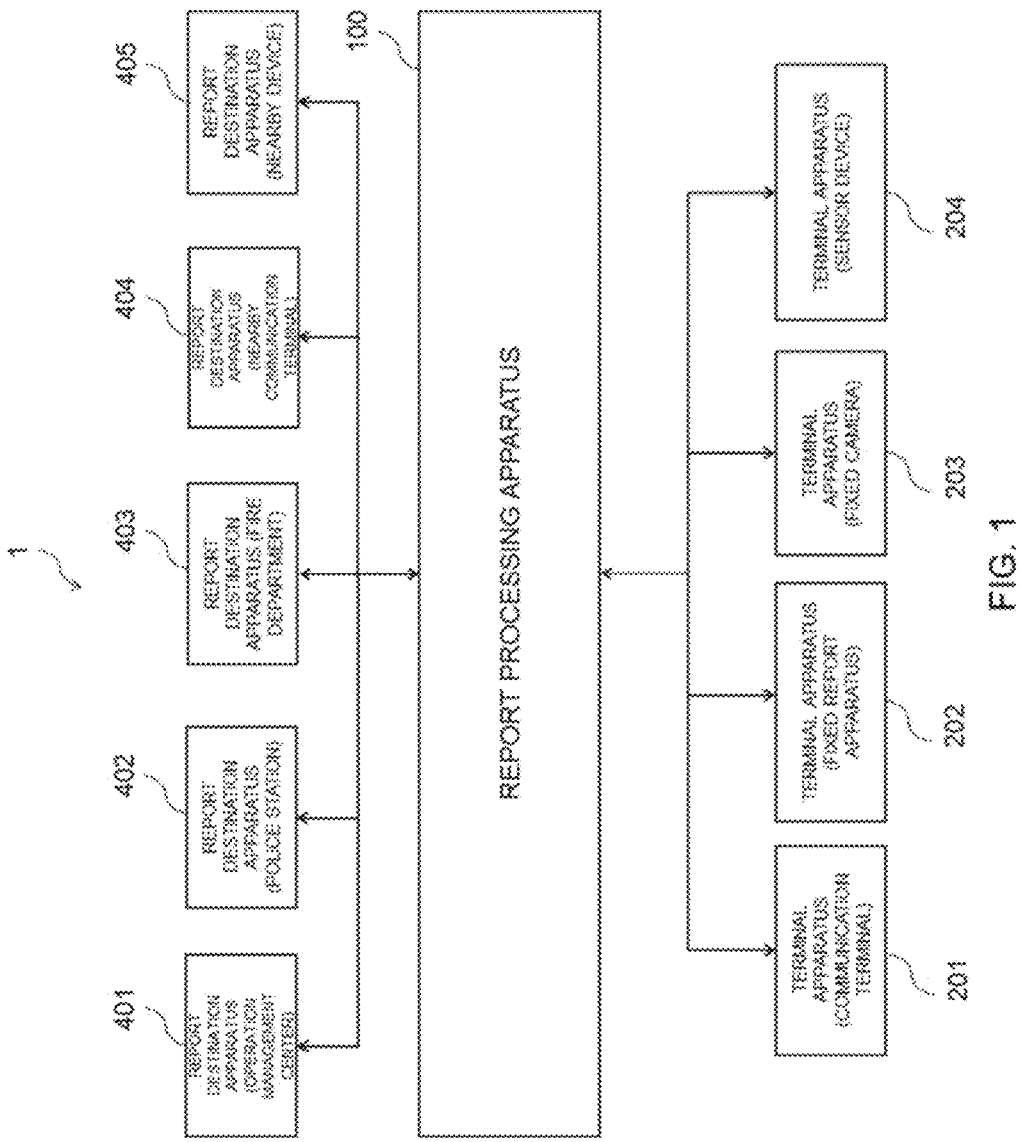
FIG. 1 is an explanatory diagram illustrating an example of a schematic configuration of a system according to an example embodiment of the present invention.

Hereinafter, example embodiments of the present invention will be described in detail with reference to the accompanying drawings. Note that, in the Specification and drawings, elements to which similar descriptions are applicable are denoted by the same reference signs, and overlapping descriptions may hence be omitted.

Descriptions will be given in the following order.
1. Overview of Example Embodiments
2. Configuration of System
3. First Example Embodiment
　3.1. Configuration of Report Processing Apparatus
　3.2. Technical Features
　3.3. Specific Example
4. Second Example Embodiment
　4.1. Configuration of Report Processing Apparatus
　4.2. Technical Features
5. Terminal Apparatus
6. Other Modes

1. Overview of Example Embodiments

First, an overview of example embodiments will be described.

(1) Technical Issues

In case of occurrence of emergency such as an incident and a disaster, a first discoverer and its victims need to perform reporting to proper authorities such as the police and the fire department. Unfortunately, however, in such a report system as described above, a reporter needs to judge an appropriate report destination according to contents, an occurrence location, and the like of an event to be reported such as the emergency, and perform reporting through a call using a mobile phone or the like. Thus, the reporter may fail to perform reporting to a proper report destination or may fail to promptly perform reporting.

Examples of the proper authorities, being report destinations, are assumed to include the police, the fire department, the coast guard, railway companies, administrators of public facilities such as a stadium, and the like. Telephone numbers of such report destinations differ depending on a proper authority. When an emergency occurs on a train, a reporter first needs to look for the location where a train emergency stop alarm apparatus is installed. When a fire occurs in a building, a reporter can perform reporting to the security office through an internal phone or the like. However, there is a problem that, when a person has suddenly got ill in a building, a reporter is not sure about where to make contact when performing reporting. In particular, when a person who is unaccustomed to coping with emergency plays a role as a reporter while a big event is taking place, it is assumable that the reporter may panic because the reporter cannot remember the report destination or does not know the report destination. When a foreigner plays a role as a reporter, it is also assumable that the reporter may take some time before coping with the emergency because the reporter cannot communicate with others due to difference of languages used, for example.

Specifically, the reporter needs to select a report destination according to a location from which an emergency report is performed and situations, and follow a reporting means. Thus, if the reporter does not have prerequisite knowledge, the reporter may cause reporting delay and wrong reporting. In particular, a traveler from a foreign country cannot perform appropriate reporting due to language barriers and a lack of prerequisite knowledge.

The reporter may not be able to continue reporting or communicating due to changes in influences caused by spreading damage done to the reporter themselves or to others and the situation of the site.

People around the damaged site may not be able to fully recognize victims and/or the situation of the damage. For example, people around the damaged site recognize the incident and the accident with their sense of vision and hearing, and this leads to differences in recognition of the situation. If people fail to make quick escape when there is an assailant nearby, a secondary disaster may not be able to be prevented. This may cause a delay in making an initial response to the emergency. It may be difficult to obtain assistance and information provision from a communication terminal (a camera of a smartphone) owned by a person around the damaged site or a device (a monitoring camera, a dashboard camera, or the like) installed around the damaged site.

Here, mobile communication devices such as a mobile phone and a smartphone are carried by a large number of people, and thus the location of the reporter can be obtained, and even if there is a hearing handicap, congestion in a communication line, or the like, communication can be performed through communication of text data or the like. By utilizing such features of the mobile communication devices as described above, an emergency report system with which anyone can promptly and properly report emergencies and the like under various situations can be expected.

In a system in which people only wait for assistance from members of the proper authority that has received the reporting from the reporter, even when there are third parties or devices that can offer support around the reporter, the reporter has hitherto been unable to receive cooperation from the third parties or the devices.

Insignificant troubles that often occur (for example, a lost child, prowling of a person, nuisances, illness that does not require life support or emergency transfer to hospital, or the like) have hitherto been unable to be immediately coped with by the authority being the report destination. Because there is a limited number of members of the proper authority being the report destination, if damages are simultaneously caused in a large-scale disaster or the like, the members may not be able to handle the rescue. Records such as witness information by third parties and dashboard cameras, which are necessary for investigating the cause of a traffic accident, need to be collected on a later day using a system different from the emergency reporting.

Not a few people take pictures and videos, making sure that they are safe from the disaster or the like. Unfortunately, however, even if these pieces of image information are made open to the public on social network services (SNSs) or the like, for example, an inspection of manipulation or the like is difficult. Even if information provision as above is prompted, identifying people who were at the damaged site becomes more and more difficult as time passes by.

Therefore, a report system with which people or devices such as cameras can promptly cooperate with each other around the reporter has been required, through the utilization of the features of the mobile communication devices.

In the light of this, an example object of the present example embodiments is to enable appropriate reporting of information related to an event to be reported when the event occurs.

More specifically, the present example embodiments focus on how to implement reporting and cooperation from surrounding people regarding an incident or a trouble that has occurred on a train, for example. In particular, a fixed emergency stop button is installed in a train. However, the reporter is not necessarily near the emergency stop button, and depending on congestion, the reporter cannot even push the button. In addition, even when a security camera is installed in a train, in many cases the incident or the trouble cannot be appropriately coped with, because cameras have dead angles. In view of this, the present example embodiments aim to enable appropriate reporting of an emergency and prompt and flexible receiving of cooperation from surrounding people, devices, and the like, through the utilization of the features of the mobile communication devices.

(2) Technical Features

According to the present example embodiment, for example, first report information reported from a terminal apparatus is obtained with respect to a target event. One or more report destinations associated with the target event are determined from a plurality of candidate report destinations based on the first report information. Information related to the first report information is transmitted to the one or more report destinations associated with the first report information.

With this configuration, for example, when an event to be reported occurs, information related to the event can be appropriately reported.

Note that the above-described technical features are concrete examples of the example embodiments of the present invention, and the example embodiments of the present invention are, of course, not limited to the above-described technical features.

2. Configuration of System

With reference to FIG. 1, an example of a configuration of a system 1 according to an example embodiment of the present invention will be described. FIG. 1 is an explanatory diagram illustrating an example of a schematic configuration of the system 1 according to the example embodiment of the present invention. With reference to FIG. 1, the system 1 includes a report processing apparatus 100, terminal apparatuses 201 to 204, and report destination apparatuses 401 to 405.

The report processing apparatus 100 performs, for example, processing related to reporting from the terminal apparatuses 201 to 204 or the like. Specific processing will be described later.

The terminal apparatus 201 is a mobile communication device, such as a mobile phone or a smartphone, that is owned by an individual. The terminal apparatus 202 is, for example, a fixed report apparatus that is installed at a station platform, on a train, or the like. The terminal apparatus 203 is a fixed camera that is installed around a station, at station premises, at a station platform, or on a train. The terminal apparatus 204 is a sensor device that has a function of detecting impact, sound, biological abnormalities, and the like, and a function of autonomously reporting information of the detected abnormalities. Each of the terminal apparatuses 201 to 204 can, for example, communicate with the report processing apparatus 100 through a communication network such as a radio access network, a radio local area network, a beacon, or a fixed line.

The report destination apparatuses 401 to 405 are communication apparatuses that can receive data from the report processing apparatus 100.

The report destination apparatus 401 is, for example, installed in an operation management center or the like. Here, the operation management center performs, for example, collection and management of information related to train operation, such as operation conditions of trains, conditions of passengers, and weather conditions. In case of occurrence of an accident or a disaster, for example, as will be described later, the operation management center instantaneously recognizes the situation, based on information from the report processing apparatus 100, and performs coordination with parties concerned, to mitigate damage and bring operation of the trains back to its normal operation. The report destination apparatus 402 is, for example, installed at a police station or the like. In addition, the report destination apparatus 403 is, for example, installed at a fire department.

The report destination apparatus 404 is a communication terminal (hereinafter also referred to as a nearby communication terminal) that is owned by a person who is located in an area near the occurrence location of the incident or the accident. Here, examples of an owner of the report destination apparatus 404 are assumed to include a person who is witnessing the occurrence of the incident, a person who cannot witness but does recognize the occurrence of the incident, and further, a person who does not recognize the occurrence of the incident at all. The report destination apparatus 405 is a device that is installed near the site of the occurrence of the incident or the accident. Examples of the report destination apparatus 405 are assumed to mainly include apparatuses, such as a fixed camera and a dashboard camera, that do not require human operation or can be remotely operated and that have a communication function, video recording, or voice recording.

3. First Example Embodiment

Next, with reference to FIG. 2 to FIG. 9, a first example embodiment of the present invention will be described.

<3.1. Configuration of Report Processing Apparatus>

Figure 2:
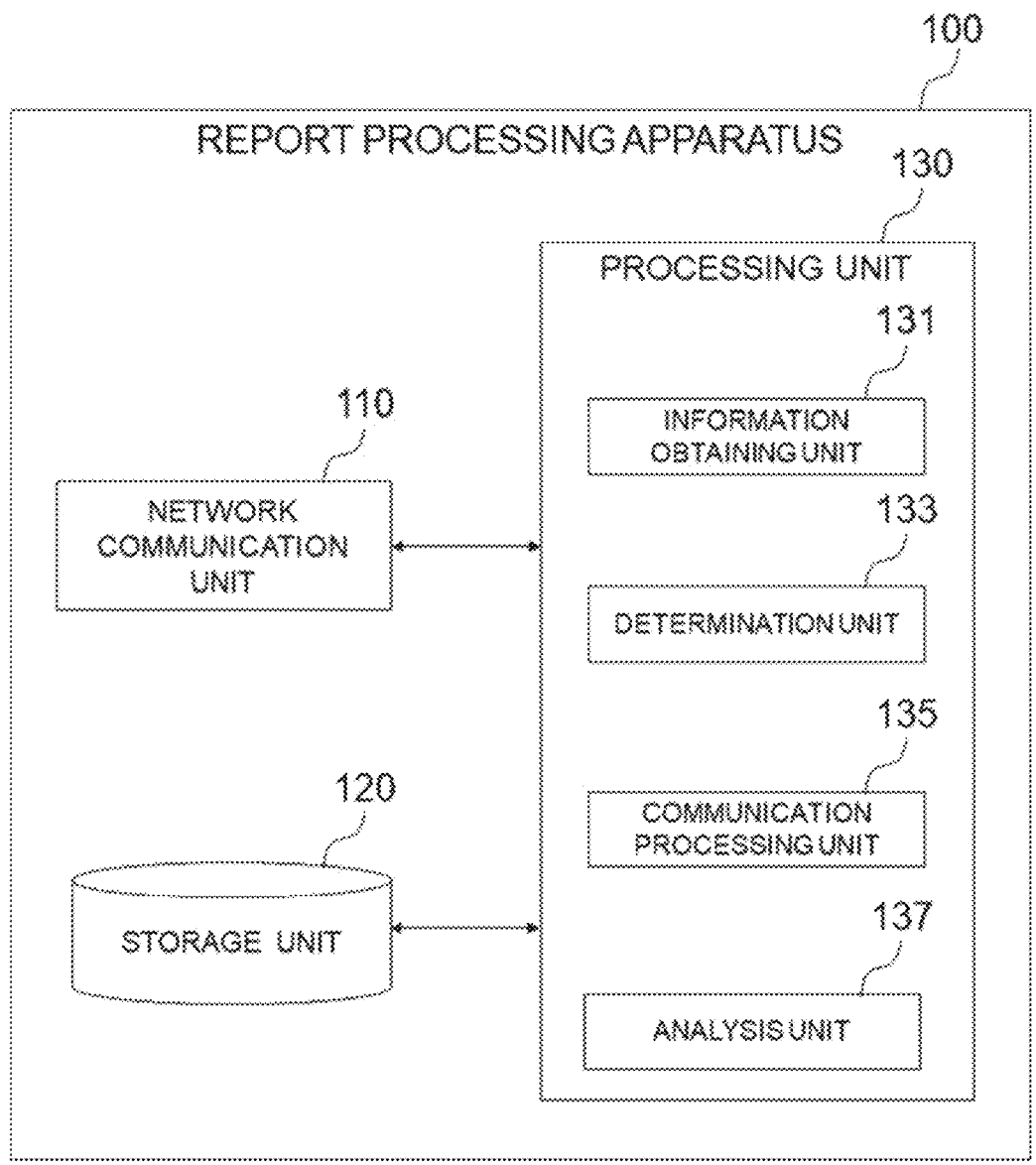
FIG. 2 is a block diagram illustrating an example of a schematic configuration of a report processing apparatus according to a first example embodiment.

Next, with reference to FIG. 2, an example of a configuration of the report processing apparatus 100 according to the first example embodiment will be described. FIG. 2 is a block diagram illustrating an example of a schematic configuration of the report processing apparatus 100 according to the first example embodiment. With reference to FIG. 2, the report processing apparatus 100 includes a network communication unit 110, a storage unit 120, and a processing unit 130.

(1) Network Communication Unit 110

The network communication unit 110 receives a signal from a network, and transmits the signal to the network.

(2) Storage Unit 120

The storage unit 120 temporarily or permanently stores a program (commands) and a parameter for operation of the report processing apparatus 100, and various pieces of data. The program includes one or more commands for operation of the report processing apparatus 100.

(3) Processing Unit 130

The processing unit 130 provides various functions of the report processing apparatus 100. The processing unit 130 includes an information obtaining unit 131, a determination unit 133, a communication processing unit 135, and an analysis unit 137. Note that the processing unit 130 may further include constituent elements other than the constituent elements above. Specifically, the processing unit 130 may perform operation other than the operation of the constituent elements above. Specific operations of the information obtaining unit 131, the determination unit 133, the communication processing unit 135, and the analysis unit 137 will be described later in detail.

For example, the processing unit 130 (communication processing unit 135) communicates with the terminal apparatus (for example, the terminal apparatuses 201 to 204) via the network communication unit 110. The processing unit 130 (communication processing unit 135) communicates with the report destination apparatus (for example, the report destination apparatuses 401 to 405) via the network communication unit 110.

(4) Implementation Example

The network communication unit 110 may be implemented with a network adapter, a network interface card, and/or the like. The storage unit 120 may be implemented with a memory (for example, a non-volatile memory and/or a volatile memory), a hard disk, and/or the like. The processing unit 130 may be implemented with one or more processors. The information obtaining unit 131, the determination unit 133, and the communication processing unit 135 may be implemented with the same processor, or may be individually implemented with different processors. The memory (storage unit 120) may be included in the one or more processors, or may be provided outside of the one or more processors.

The report processing apparatus 100 may include a memory that stores programs (commands), and one or more processors that can execute the programs (commands). The one or more processors may perform operation of the processing unit 130 (operation of the information obtaining unit 131, the determination unit 133, the communication processing unit 135, and/or the analysis unit 137) by executing the programs. The program may be a program for causing the processor(s) to execute the operation of the processing unit 130 (operation of the information obtaining unit 131, the determination unit 133, the communication processing unit 135, and/or the analysis unit 137).

<3.2. Technical Features>

Next, technical features of the first example embodiment will be described.

The report processing apparatus 100 (information obtaining unit 131) obtains first report information that is reported from the terminal apparatus (terminal apparatuses 201 to 204) with respect to a target event. Then, the report processing apparatus 100 (determination unit 133) determines one or more report destinations associated with the target event from a plurality of candidate report destinations (report destination apparatuses 401 to 405), based on the first report information. Then, the report processing apparatus 100 (communication processing unit 135) transmits information related to the first report information to the one or more report destinations associated with the first report information.

The target event is, for example, an event that may be an emergency, such as an incident, an accident, and a disaster. The first report information is, for example, information to be reported to the above-described proper authorities that are supposed to cope with the emergency, a person who may be a cooperator who copes with the emergency, and the like. The information related to the first report information may be information the same as the first report information, or may be information that is created by the report processing apparatus 100 based on the first report information.

(1) First Report Information

The first report information is, for example, information that is transmitted from the terminal apparatus 201 to the report processing apparatus 100 according to operation of the reporter who has encountered the target event. Alternatively, for example, the first report information may be information that is transmitted from the terminal apparatuses 202 to 204 that have detected the event to the report processing apparatus 100. More specifically, the first report information may include pieces of information as follows.

Event Type (Type)

The first report information may include information related to an event type corresponding to the target event from two or more event types. Examples of the two or more event types are assumed to include an incident, an accident, a fire, and the like. In this case, the reporter who has encountered the target event selects an event type corresponding to the target event according to a graphic user interface that is displayed in a display of the terminal apparatus 201, for example. Through the selection operation as above, the first report information including the information related to the event type is transmitted form the terminal apparatus 201 to the report processing apparatus 100. The report processing apparatus 100 can recognize under which event type the target event falls, based on the information related to the event type.

Location Information of Terminal Apparatus

The first report information may include location information of the terminal apparatus. For example, the location information of the terminal apparatus is information that is obtained by the terminal apparatus by using a location information obtaining means such as the Global Positioning System (GPS). For example, the location information is transmitted from the terminal apparatus 201 to the report processing apparatus 100 according to operation performed by the reporter. The report processing apparatus 100 can recognize at which location the target event occurs, based on the location information of the terminal apparatus.

Acceleration Information of Terminal Apparatus

The first report information may include acceleration information of the terminal apparatus. For example, the acceleration information of the terminal apparatus 201 is information that is obtained by the terminal apparatus 201 by using an acceleration sensor incorporated in the terminal apparatus 201, and is transmitted from the terminal apparatus 201 to the report processing apparatus 100 according to operation performed by the reporter, for example. The report processing apparatus 100 can recognize whether the reporter carrying the terminal apparatus 201 is riding a vehicle or the like, such as whether the reporter is moving by taking a train, based on the acceleration information of the terminal apparatus 201.

Voice, Text, Image, and Video

It is assumable that situations of the incident or the accident and/or the reporter themselves are different, and thus the first report information may include voice data, text data, image data, and/or video data. In particular, for the first report information, any type of data out of the voice data, the text data, the image data, and the video data may be selectable according to operation performed by the reporter on the terminal apparatus 201 or the like.

Personal Information of Reporter

The first report information may include, for example, personal information of the reporter, such as a name, gender, age, a mobile phone number, or the like, and biological information (a heart rate or the like). With such pieces of personal information being provided for the report processing apparatus 100, for example, the emergency can be promptly coped with when the reporter is a person who suffers from some damage and/or a victim. Malicious reporting can be prevented.

(2) Determination of Transmission Destination (2-1) Determination Based on Relevance The report processing apparatus 100 (determination unit 133) may determine one or more report destinations whose relevance to the target event meets a predetermined condition from the plurality of candidate report destinations (for example, the report destination apparatuses 401 to 405), based on the first report information.

For example, one or more transmission destinations whose relevance to the target event meets the predetermined condition are determined based on the information related to the event type. Specifically, when the target event is "incident", as the one or more transmission destinations whose relevance to the target event meets the predetermined condition, the report destination apparatus 402 that is installed at the police station is determined. When the target event is "fire", as the one or more transmission destinations whose relevance to the target event meets the predetermined condition, the report destination apparatus 403 that is installed at the fire department is determined. When the target event is "incident on a train", as the one or more transmission destinations whose relevance to the target event meets the predetermined condition, the report destination apparatus 401 that is installed at the operation management center and the report destination apparatus 402 that is installed at the police station are determined.

For example, when it is judged based on the acceleration information of the terminal apparatus 201 that the reporter is moving on a train, as the one or more transmission destinations whose relevance to the target event meets the predetermined condition, the report destination apparatus 401 installed at the operation management center is determined. In this case, it may be arranged that an assistance request is not performed for passengers on trains that travel in a direction opposite to the train in which the target event occurs. Specifically, terminal apparatuses carried by the passengers on the trains that travel in the opposite direction may be excluded from the one or more transmission destinations whose relevance to the target event meets the predetermined condition.

(2-2) Determination Based on Location

The report processing apparatus 100 (analysis unit 137) may identify the location of the terminal apparatus by analyzing the first report information. For example, when the location information of the terminal apparatus is included in the first report information, the analysis unit 137 may identify the location information extracted through the analysis of the first report information as the location of the terminal apparatus. Note that the analysis unit 137 may identify the location of the terminal apparatus by analyzing the Internet Protocol (IP) address information of the first report information or the like.

When the location of the terminal apparatus is identified, the report processing apparatus 100 (determination unit 133) determines one or more report destinations associated with the target event from the plurality of candidate report destinations (for example, the report destination apparatuses 404 and 405), based on the identified location of the terminal apparatus.

Specifically, the one or more report destinations associated with the target event may be one or more radio communication apparatuses that are located in a predetermined neighborhood area from the location of the terminal apparatus in a radio access network. For example, the report processing apparatus 100 determines the radio communication apparatus (for example, the report destination apparatus 404) that is located in a coverage area of a base station installed within a radius of 100 m from the location of the terminal apparatus 201 as the one or more report destinations associated with the target event.

In this manner, the nearby communication terminal (report destination apparatus 404) that is located near the reporter (terminal apparatus 201) is determined as the report destination. Then, the information related to the first report information is transmitted to the nearby communication terminal (report destination apparatus 404). In this manner, a carrying person of the nearby communication terminal can recognize the target event (the incident, the accident, the disaster, or the like) quickly. The carrying person of the nearby communication terminal can play a role as a rescuer or a cooperator who copes with the target event.

The report processing apparatus 100 (communication processing unit 135) may receive second report information that is reported with respect to the target event from the one or more transmission destinations located in the predetermined neighborhood area from the location of the terminal apparatus. Here, the second report information can be, for example, interpreted as follow-up information and detailed information of the first report information. More specifically, when the target event is a fire, the second report information is, for example, image information (situation of the fire or the like) that is captured by the carrying person of the nearby communication terminal (for example, the report destination apparatus 404) after reporting the first report information.

In this manner, by receiving the second report information, the report processing apparatus 100 can be more promptly informed of changes of the situation of the target event. The report processing apparatus 100 can determine an appropriate report destination(s) (for example, the report destination apparatuses 401 to 403), based on the second report information, and provide (transmit) the information related to the second report information, for the police station (report destination apparatus 402), the fire department (report destination apparatus 403), and/or the like.

In addition, because the nearby communication terminal (for example, the report destination apparatus 404) is prompted to report the second report information, the information related to the first report information may include information for requesting the second report information. The information for requesting the second report information is, for example, information for displaying a graphic user interface for prompting image capturing using a camera installed in the nearby communication terminal, and the like.

(3) Analysis of Report Information

The report processing apparatus 100 (analysis unit 137) is not limited to analyzing the location of the terminal apparatus. For example, when the first report information includes voice, image, or video data, the report processing apparatus 100 (analysis unit 137) may analyze these pieces of data and comprehend and infer the situation of the site of the target event in detail.

For example, the report processing apparatus 100 (analysis unit 137) may perform dictation of the voice data included in the first report information. Text data obtained through the dictation is, for example, transmitted to the one or more report destinations as the information related to the first report information.

When the first report information includes the location information of the terminal apparatus, the report processing apparatus 100 (analysis unit 137) may infer the occurrence location of the target event by analyzing the location information. In addition, when the target event occurs on a train or the like, the report processing apparatus 100 (analysis unit 137) may identify a location or the like from a car number and/or a location with respect to a door of the train as the occurrence location, based on the image data or the like.

The report processing apparatus 100 (analysis unit 137) may analyze an index value (also referred to as a situation urgency), which indicates, with a numerical value, a degree of emergency at the occurrence location of the target event, based on image recognition using the image data included in the first report information. The report processing apparatus 100 (analysis unit 137) may analyze the situation urgency of the target event, based on voice recognition using the voice data included in the first report information.

When the target event is an incident, the report processing apparatus 100 (analysis unit 137) may infer behaviors of victims, characteristics of a suspect, or behaviors of surrounding people (whether or not there is any partner in crime or the like), based on person recognition using the image data included in the first report information. These inferred results may be used for profile verification for past medical histories of victims, past criminal records of the suspect, and the like.

The information analyzed by the analysis unit 137 as described above may be included in the information related to the first report information. With this configuration, initial action regarding the target event can be more appropriately taken.

(4) Management of Report Information

In order to enhance confidentiality of the first report information reported from the terminal apparatus (for example, the terminal apparatuses 201 to 204) and the second report information reported from the report destination apparatus (for example, the report destination apparatuses 404 and 405), the report processing apparatus 100 may encrypt these pieces of information and store the pieces of information in the storage unit 120.

<3.3. Specific Example>

Figure 3:
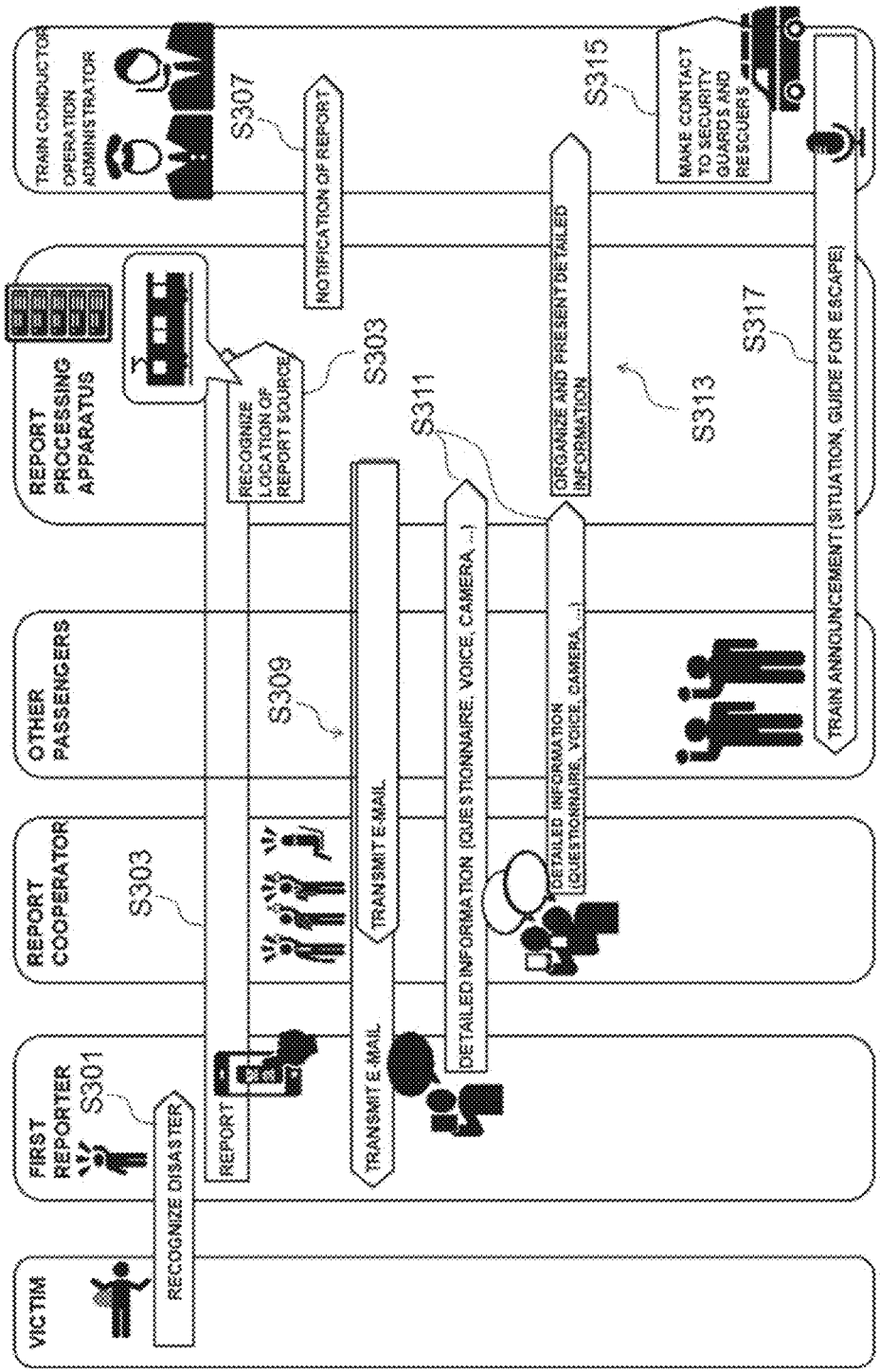
FIG. 3 is a diagram for illustrating a specific example according to the first example embodiment.

Next, with reference to FIG. 3 to FIG. 6 and other figures, a specific example according to the first example embodiment will be described. FIG. 3 is a diagram for illustrating a specific example according to the first example embodiment.

First, a victim or the first reporter recognizes a disaster (Step S301), and transmits (reports) the first report information from the terminal apparatus 201 to the report processing apparatus 100 (Step S303).

Subsequently, the report processing apparatus 100 analyzes the first report information received from the terminal apparatus 201, and recognizes a location of the terminal apparatus 201 (report source) (Step S305). The report processing apparatus 100 transmits the information related to the first report information to an appropriate report destination apparatus (operation management center or the like) based on the first report information (Step S307).

The report processing apparatus 100 transmits the information related to the first report information to the first reporter (terminal apparatus 201) and the nearby communication terminals (for example, the report destination apparatus 404) carried by people around the first reporter by using e-mail delivered exclusively in a designated area or the like, based on the first report information (for example, the location information or the like) (Step S309).

Figure 4:
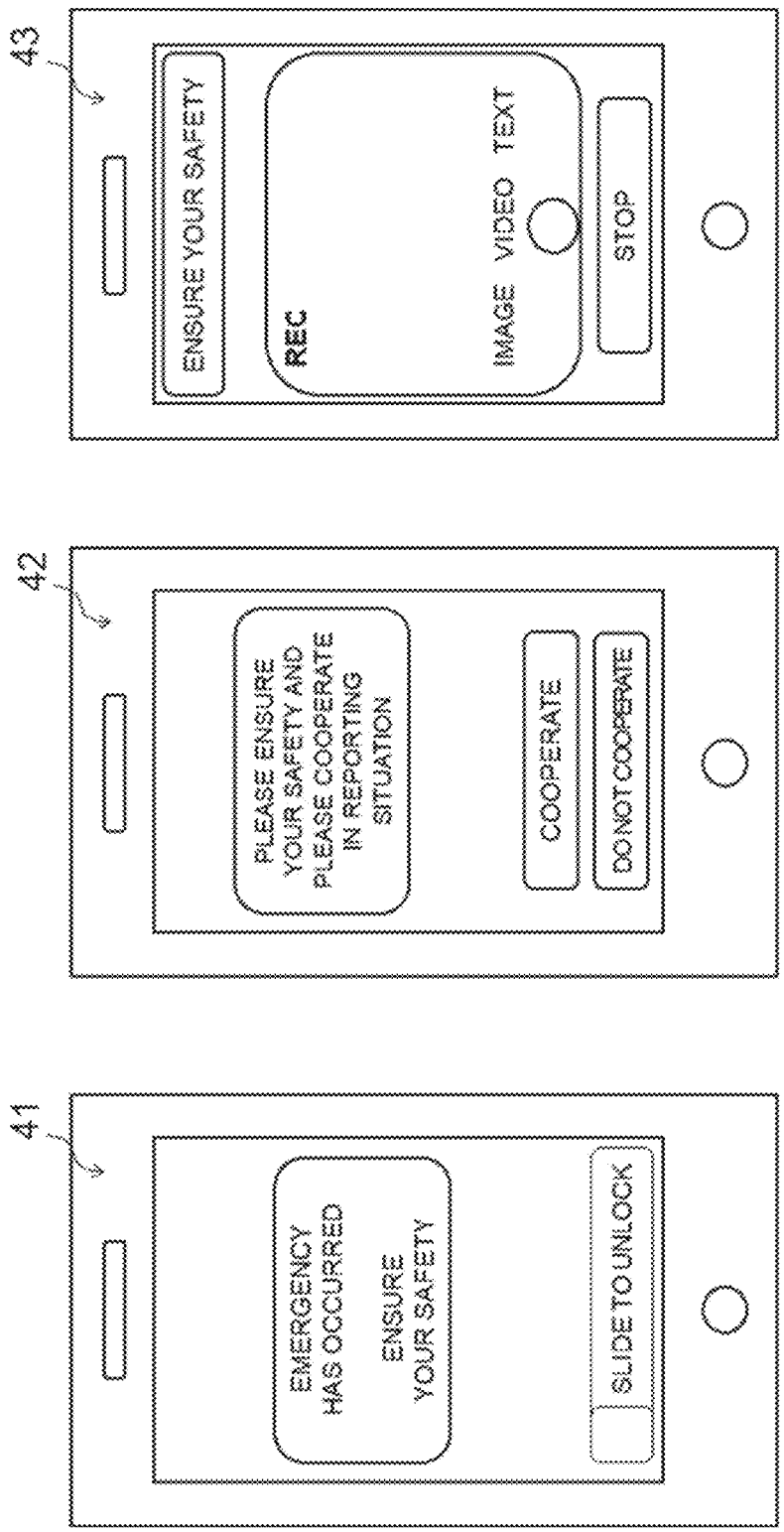
FIG. 4 is a diagram illustrating screens displayed according to information related to first report information.

FIG. 4 is a diagram illustrating screens displayed according to the information related to the first report information. Specifically, in the display of the nearby communication terminal (for example, the report destination apparatus 404), as illustrated in FIG. 4, information 41 related to the target event (for example, a situation of the disaster) is displayed. In the display of the nearby communication terminal (for example, the report destination apparatus 404), as illustrated in FIG. 4, information 42 for requesting reporting of the situation of the target event (the second report information) is displayed. In the display of the nearby communication terminal (for example, the terminal apparatus 201), as illustrated in FIG. 4, information 43 for performing reporting of the situation of the target event (the second report information) is displayed. The carrying person of the nearby communication terminal (for example, the report destination apparatus 404), as a cooperator, follows the information 43 illustrated in FIG. 4 and transmits the second report information (voice, a camera, a video, or text) to the report processing apparatus 100 (Step S311).

The report processing apparatus 100 organizes the detailed information (the second report information), and transmits (presents) the organized information to an appropriate report destination apparatus (operation management center or the like) or the like (Step S313).

Meanwhile, a proper authority such as the operation management center recognizes the first report information and the detailed information (the second report information) presented by the report processing apparatus 100, analyzes situations that change from moment to moment, and judges a method of coping with the target event. Then, for example, the proper authority such as the operation management center makes contact to security guards and rescuers (Step S315). For example, the proper authority such as the operation management center makes a train announcement (announcement of situations, announcement for guide for escape, or the like) (Step S317).

Figure 5:
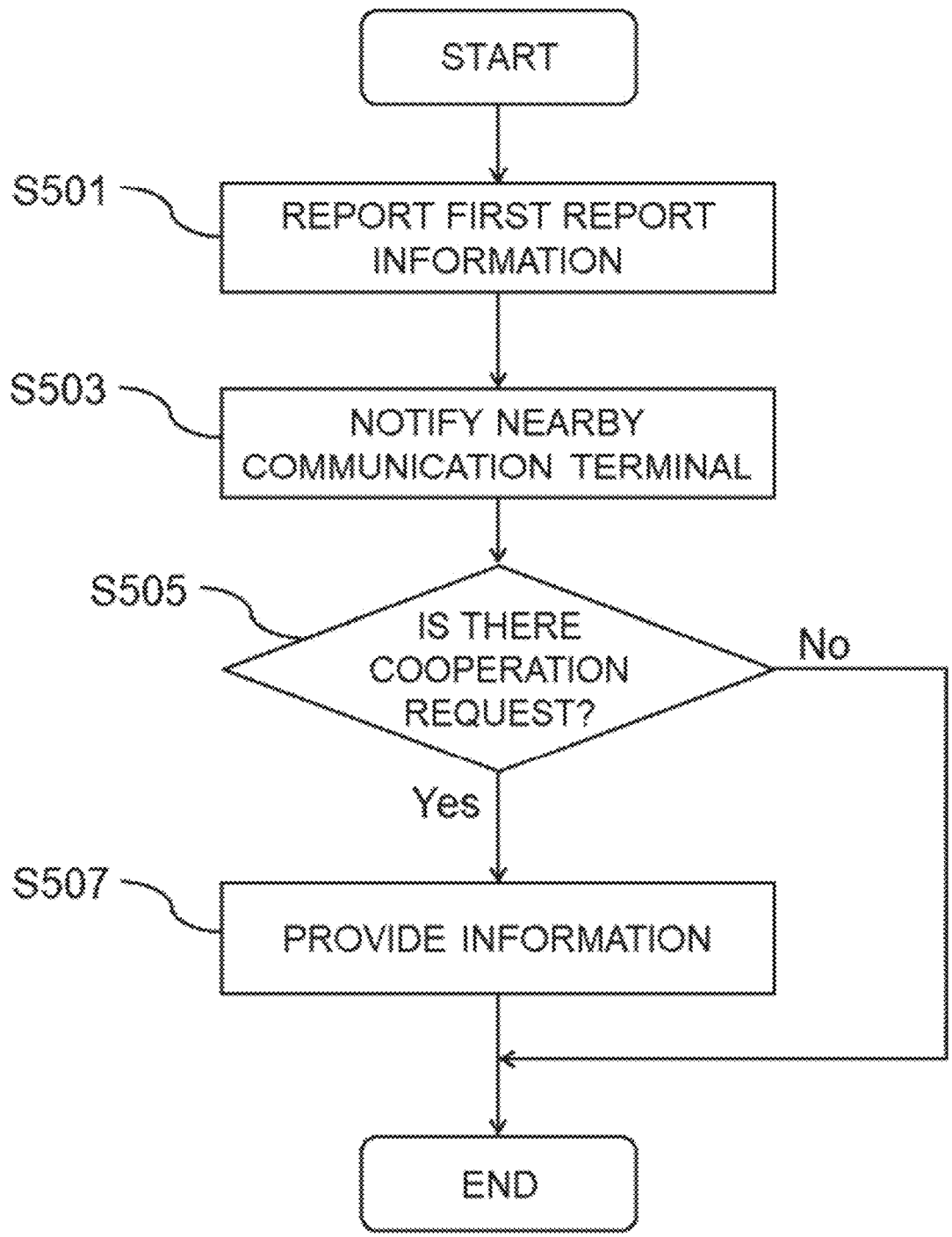
FIG. 5 is a flowchart for illustrating a procedure of a cooperation request for a nearby terminal apparatus.

Cooperation Request Processing for Nearby Communication Terminal (FIG. 5)

Next, with reference to FIG. 5, cooperation request processing for the nearby communication terminal will be described. FIG. 5 is a flowchart for illustrating a procedure of a cooperation request for the nearby terminal apparatus.

First, the first report information is reported from the terminal apparatus (for example, the terminal apparatus 201) to the report processing apparatus 100 (Step S501). Subsequently, with the first report information being analyzed by the report processing apparatus 100, the information related to the first report information is reported (transmitted) to the nearby communication terminal (for example, the report destination apparatus 404) (Step S503).

Next, the nearby communication terminal (for example, the report destination apparatus 404) judges whether or not information indicating a cooperation request is included in the information related to the first report information. Then, if the information indicating the cooperation request is included (S505: Yes), the nearby communication terminal (for example, the report destination apparatus 404) provides (transmits) the second report information for the report processing apparatus 100 (Step S507), and terminates the processing illustrated in FIG. 5. On the other hand, if the information indicating the cooperation request is not included (S505: No), the processing illustrated in FIG. 5 is terminated without the provision of the second report information.

Note that whether or not the first report information includes the "information indicating the cooperation request" may be determined according to the degree of emergency of the target event. For example, in a case of reporting when there is a serious case such as an incident or an accident, the report processing apparatus 100 may automatically include the cooperation request in the information related to the first report information, whereas in a case of reporting when there is information provision (for example, detecting a mudflow disaster), the report processing apparatus 100 may perform selection (or judgement) as to whether or not the cooperation request is to be included in the information related to the first report information.

A person owing a device (for example, the report destination apparatus 405) that has received the cooperation request is not limited to selecting whether to "receive" or "not receive" the cooperation request. For example, regarding a nearby device (an Internet of things (IoT) device), in particular, an apparatus (for example, the report destination apparatus 405) owned by an individual, approval as to whether or not to agree to the cooperation request may be submitted to the report processing apparatus 100 in advance. In this case, the nearby device (for example, the report destination apparatus 405) from which cooperation has been approved in advance may perform operation of setting a flag indicating "information indicating the cooperation request" to perform information provision.

As described above, the nearby communication terminal or the nearby device (for example, the report destination apparatus 404 or the report destination apparatus 405) that has received the request of information provision asks the carrying person or the owner for consent to the information provision. Note that, when the information provision is requested for the reporter (the carrying person of the terminal apparatus (for example, the terminal apparatus 201) that has performed reporting of the first report information), consent to the information provision may be unnecessary.

In the example illustrated in the FIG. 4, the target to which the cooperation request is made is the carrying person of the nearby communication terminal, but this is not restrictive. For example, the target to which the cooperation request is made may be a nearby device (for example, the report destination apparatus 405) such as a device of a monitoring camera or the like.

For example, in a case that what is requested in the above request of provision is past information, the nearby device (for example, the report destination apparatus 405) such as a device of a monitoring camera or the like may read sensor information at corresponding time from a storage apparatus, and provide the sensor information for the report processing apparatus 100. Here, when the storage apparatus is present outside of the apparatus such as a cloud network, the information provision request may be forwarded to the outside storage apparatus.

The nearby device (for example, the report destination apparatus 405) such as a device of a monitoring camera or the like may transmit a confirmation message of the information provision as in the following example, for example, to the terminal apparatus of the owner. Specifically, the nearby device (for example, the report destination apparatus 405) transmits a confirmation message "The police have sent you a request to provide information with respect to the accident that has occurred nearby. Do you agree to providing the following information?" to the terminal apparatus of the owner. When a response message "OK (agree to providing the information)" is transmitted from the terminal apparatus to the nearby device (for example, the report destination apparatus 405), the information provision may be performed.

Figure 6:
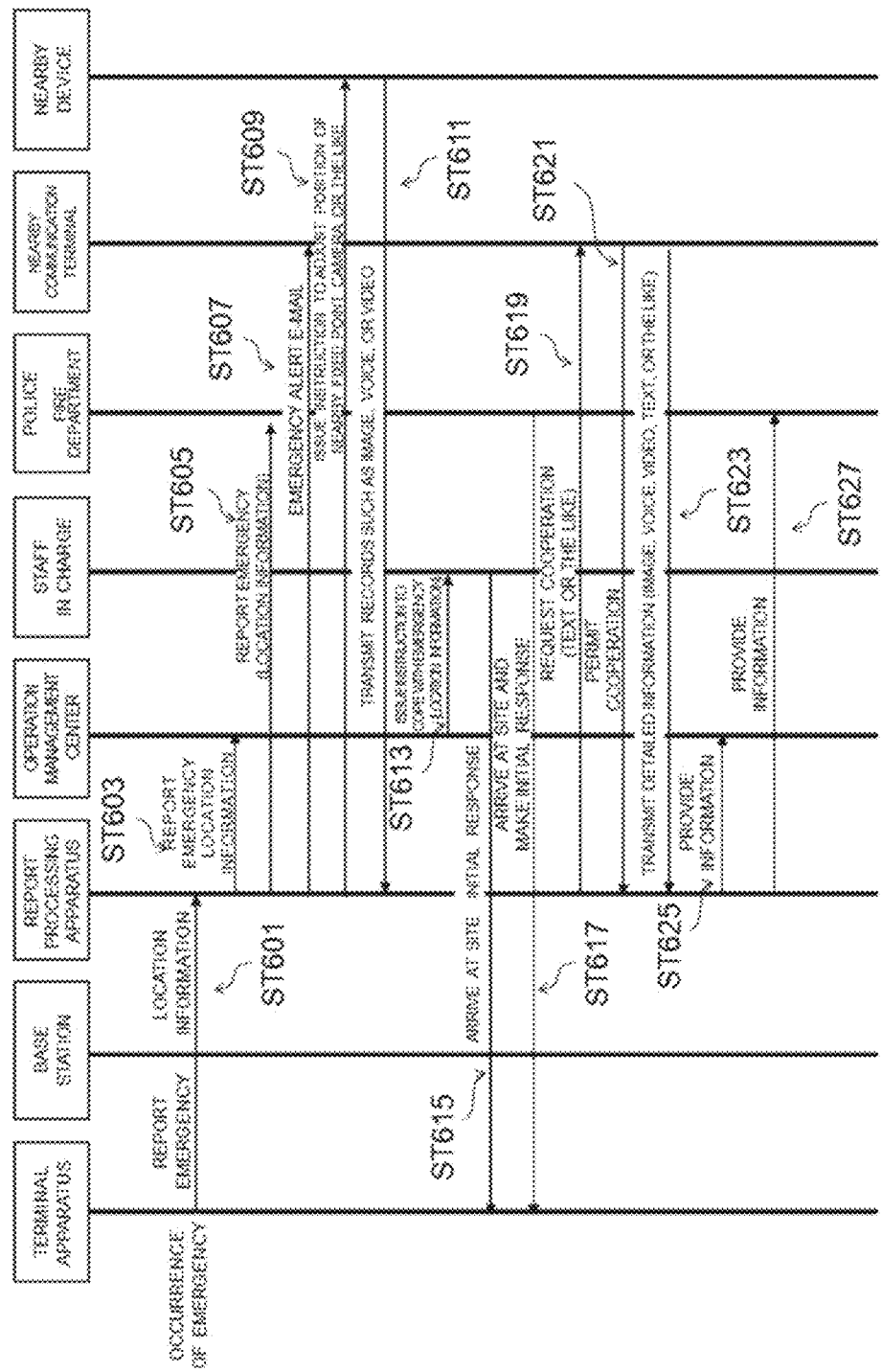
FIG. 6 is a diagram for illustrating operation of an example.

Description of Operation of Example (FIG. 6)

Next, with reference to FIG. 6, operation of an example will be described. FIG. 6 is a diagram for illustrating operation of an example.

First, emergency reporting of the first report information is performed from the terminal apparatus 201 to the report processing apparatus 100 via a base station (ST601). Subsequently, the report processing apparatus 100 analyzes the first report information, and performs emergency reporting of the information related to the first report information to the operation management center, the police, and the fire department (ST603 and ST605). The report processing apparatus 100 transmits the information related to the first report information to the nearby communication terminal (for example, the report destination apparatus 404) of the terminal apparatus 201 by using emergency alert e-mail (ST607). In addition, the report processing apparatus 100 transmits command information, such as adjustment of the scope of a fixed point observation camera, to the nearby device (for example, the report destination apparatus 405) of the terminal apparatus 201 (ST609).

Subsequently, data recorded by the nearby device (for example, the report destination apparatus 405), such as images, voice, and videos, is transmitted to the report processing apparatus 100 (ST611). An instruction to cope with the emergency (location information of the target event and the like) is issued from the operation management center to a staff in charge of taking care of the target event (ST613). The staff in charge, police officers, and firefighters arrive at the site of the target event (ST615 and ST617). In addition, information (text data or the like) related to a cooperation request is transmitted from the report processing apparatus 100 to the nearby communication terminal (for example, the report destination apparatus 404) (ST619). Subsequently, for example, the nearby communication terminal (for example, the report destination apparatus 404) transmits information indicating cooperation permission, to the report processing apparatus 100 (ST621).

Subsequently, the second report information (images, voice, videos, text, or the like) is transmitted from a user (for example, the report destination apparatus 404) that has obtained the cooperation permission to the report processing apparatus 100 (ST623). Subsequently, the report processing apparatus 100 performs collection and analysis of the information, and provides the collected and analyzed results to the operation management center, the police, and the fire department (ST625 and ST627).

Note that, for the information transmitted to the nearby communication terminal, the Public Warning System (PWS) may be used. The predetermined neighborhood area from the location of the terminal apparatus 201 may be set by the report processing apparatus 100, the terminal apparatus 201, a management apparatus of a mobile communication network, or the like. The report destination apparatus that has received the request of the second report information may ask the carrying person or the owner of the report destination apparatus for consent to the information provision. When the second report information is information preceding a certain period of time, the request time information may be included in the second report information. When data recorded in the nearby device is present outside such as in a cloud network, the nearby device may forward the information provision request to the outside storage apparatus.

Effect of Example

According to the example described above, the carrying person (reporter) of the terminal apparatus 201 can perform emergency reporting. An appropriate report destination is selected by the report processing apparatus 100, based on the location of the reporter or the like, and thus reporting delay, wrong reporting, and the like are prevented. Collection of evidence related to the target event can be requested to the nearby communication terminal or the like via the report processing apparatus 100. The cooperator (carrying person of the nearby communication terminal) can provide images and videos as evidence. The report processing apparatus 100 can change the area for making the request of the information provision according contents of reporting, urgency, and the like. The report processing apparatus 100 can encrypt the collected pieces of information in such a manner that third parties cannot freely view or alter the pieces of information, with the result that these pieces of information can be concealed. Owing to the information related to the first report information, people in a neighborhood area of the occurrence location of the target event can promptly recognize the incident and quickly take action according to the situation.

Other Examples

Figure 7:
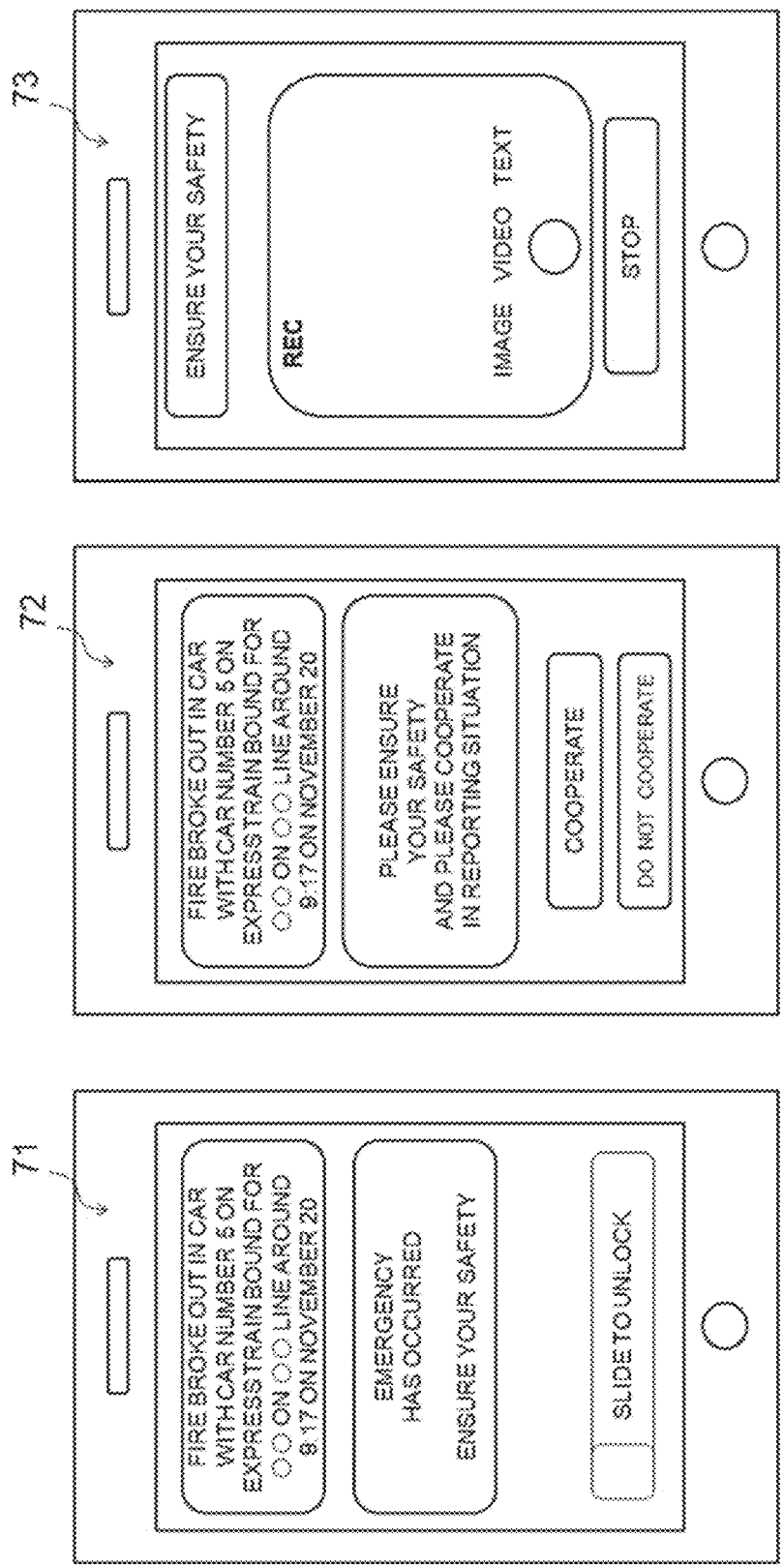
FIG. 7 is a diagram illustrating screens of another example displayed according to the information related to the first report information.

For example, the screens displayed according to the information related to the first report information are not limited to the screens as those illustrated in FIG. 4 described above. FIG. 7 is a diagram illustrating screens of another example displayed according to the information related to the first report information.

Specifically, in the display of the nearby communication terminal (for example, the report destination apparatus 404), as illustrated in FIG. 7, information 71 related to the time of occurrence, the location, and the type (for example, a fire on a train) of the target event (for example, a situation of the disaster) may be displayed. In the display of the nearby communication terminal (for example, the report destination apparatus 404), as illustrated in FIG. 7, information 72 for requesting reporting of the situation of the target event (the second report information) may be displayed. Here, in the information 72 as well, the information related to the time of occurrence, the location, and the type (for example, a fire on a train) of the target event (for example, a situation of the disaster) may be included. In the display of the nearby communication terminal (for example, the terminal apparatus 201), as illustrated in FIG. 7, information 73 for performing reporting of the situation of the target event (the second report information) is displayed. With such pieces of information being provided for the carrying person of the nearby communication terminal and the like, the carrying person can know details related to the event, such as to where the carrying person should escape.

Note that, in the display of the nearby communication terminal (for example, the report destination apparatus 404), detailed information (for example, information related to the second report information) and follow-up information may be received from the report processing apparatus 100. When the information related to the time of occurrence, the location, and the type (for example, a fire on a train) of the target event (for example, a situation of the disaster) is not included in the first report information, these pieces of information may be included in the detailed information and the follow-up information. The display of the nearby communication terminal (for example, the report destination apparatus 404) may perform pop-up display of the detailed information and the follow-up information. The nearby communication terminal (for example, the report destination apparatus 404) may have a function enabling obtaining of an escape route or the like based on the data collected by the report processing apparatus 100, according to a button operation on the screen.

Figure 8:
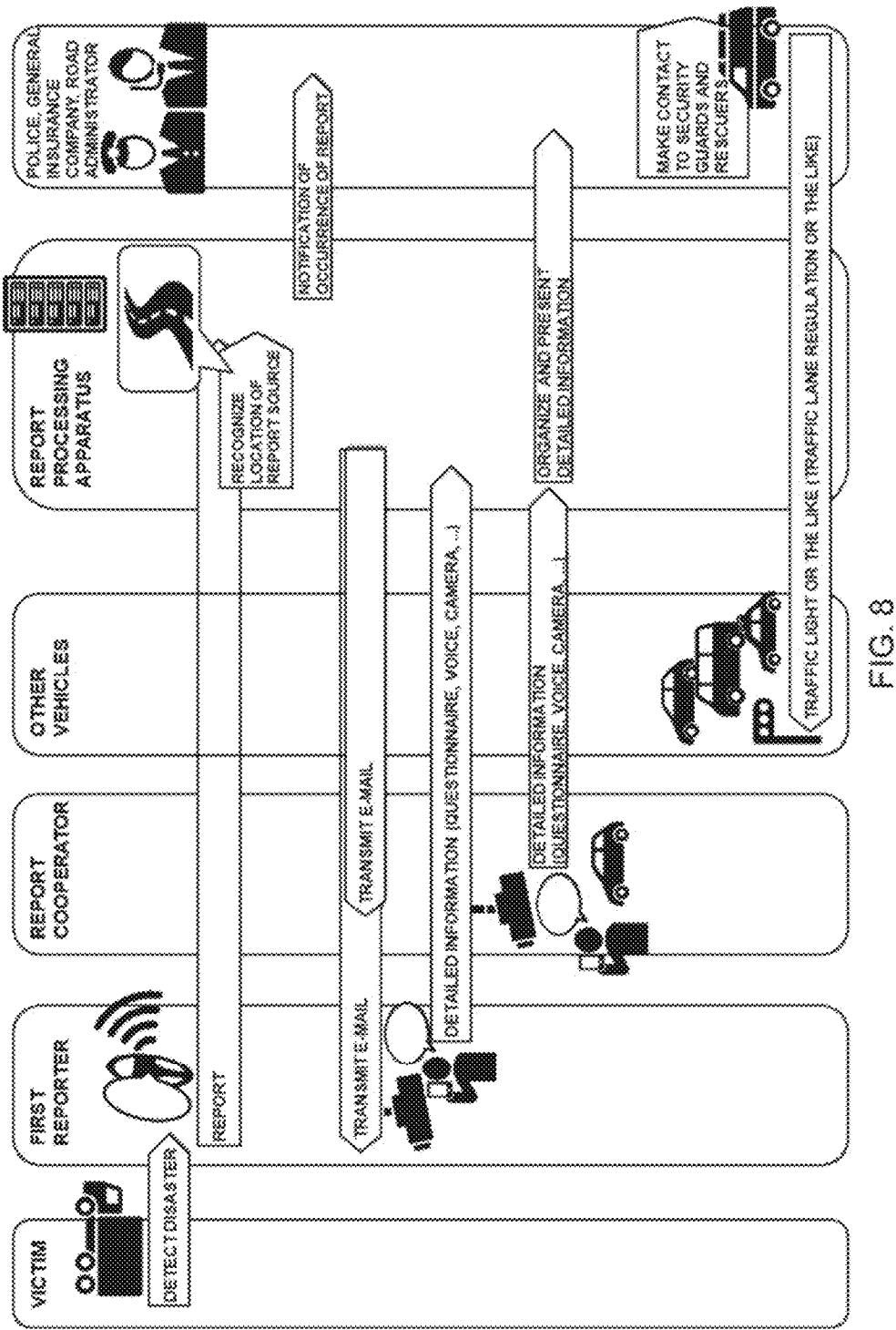
FIG. 8 is a diagram illustrating an example assuming reporting of a traffic accident as another example.

FIG. 8 is a diagram illustrating an example assuming reporting of a traffic accident as another example. In the example illustrated in FIG. 8, a dashboard camera of a vehicle involved in an accident may transmit the first report information to the report processing apparatus 100. In this case, nearby dashboard cameras and nearby people of the vehicle involved in the accident, security cameras installed at the occurrence location of the accident, and the like may be the report destinations. Further, the second report information may be provided by the report destinations for the report processing apparatus 100.

Figure 9:
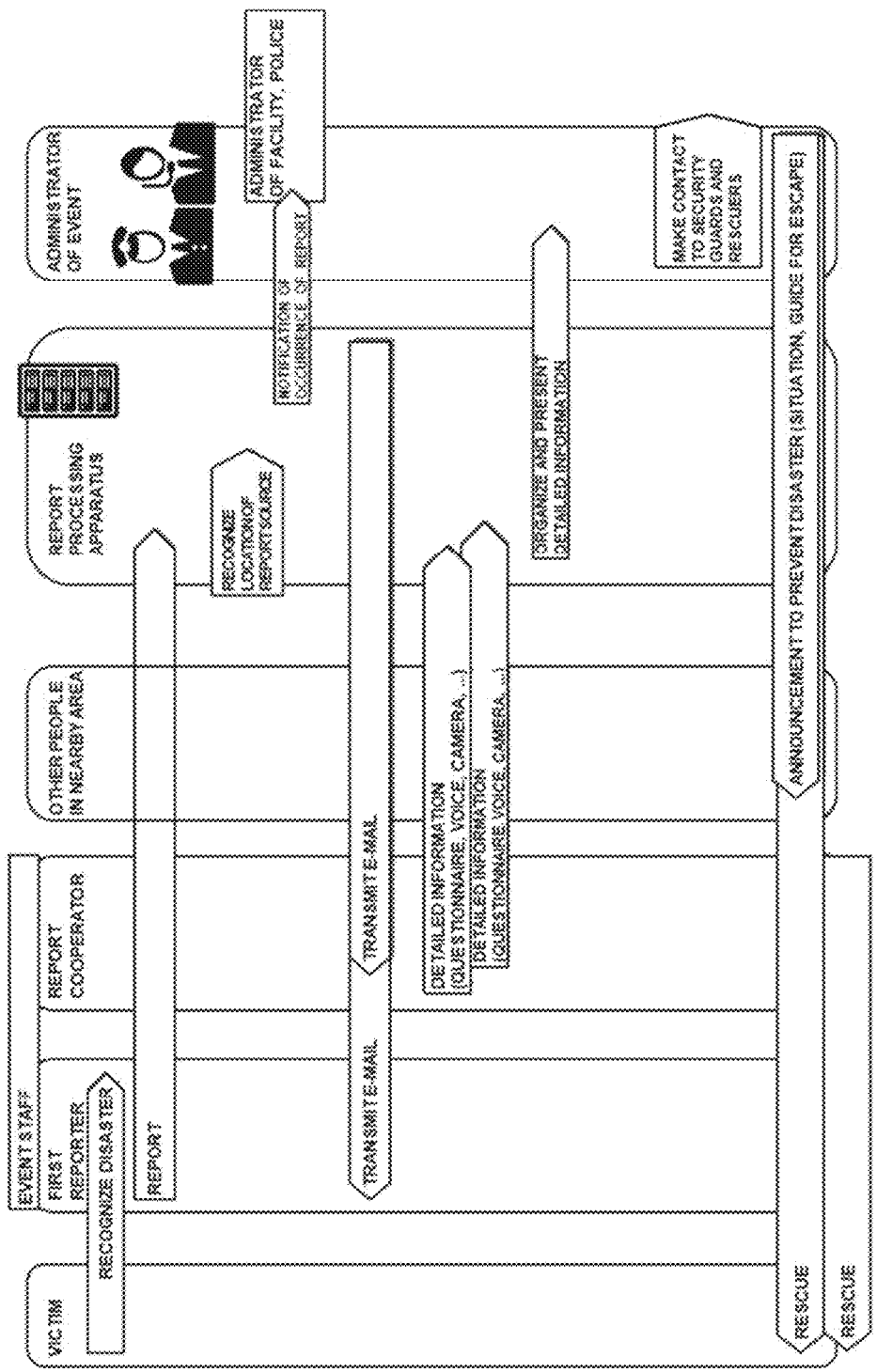
FIG. 9 is a diagram illustrating an example assuming compensation of security of an event as another example.

FIG. 9 is a diagram illustrating an example assuming compensation of security of an event as another example. In the example illustrated in FIG. 9, when a security guard or a volunteer of the event recognizes a disaster, the first report information may be reported to the report processing apparatus 100. In this case, the information related to the first report information is transmitted to nearby communication terminals carried by event staff such as organizers of the event and people in charge of the place, security guards, and other volunteers, and information related to the accident that has occurred during the event is thereby promptly shared.

Figure 10:
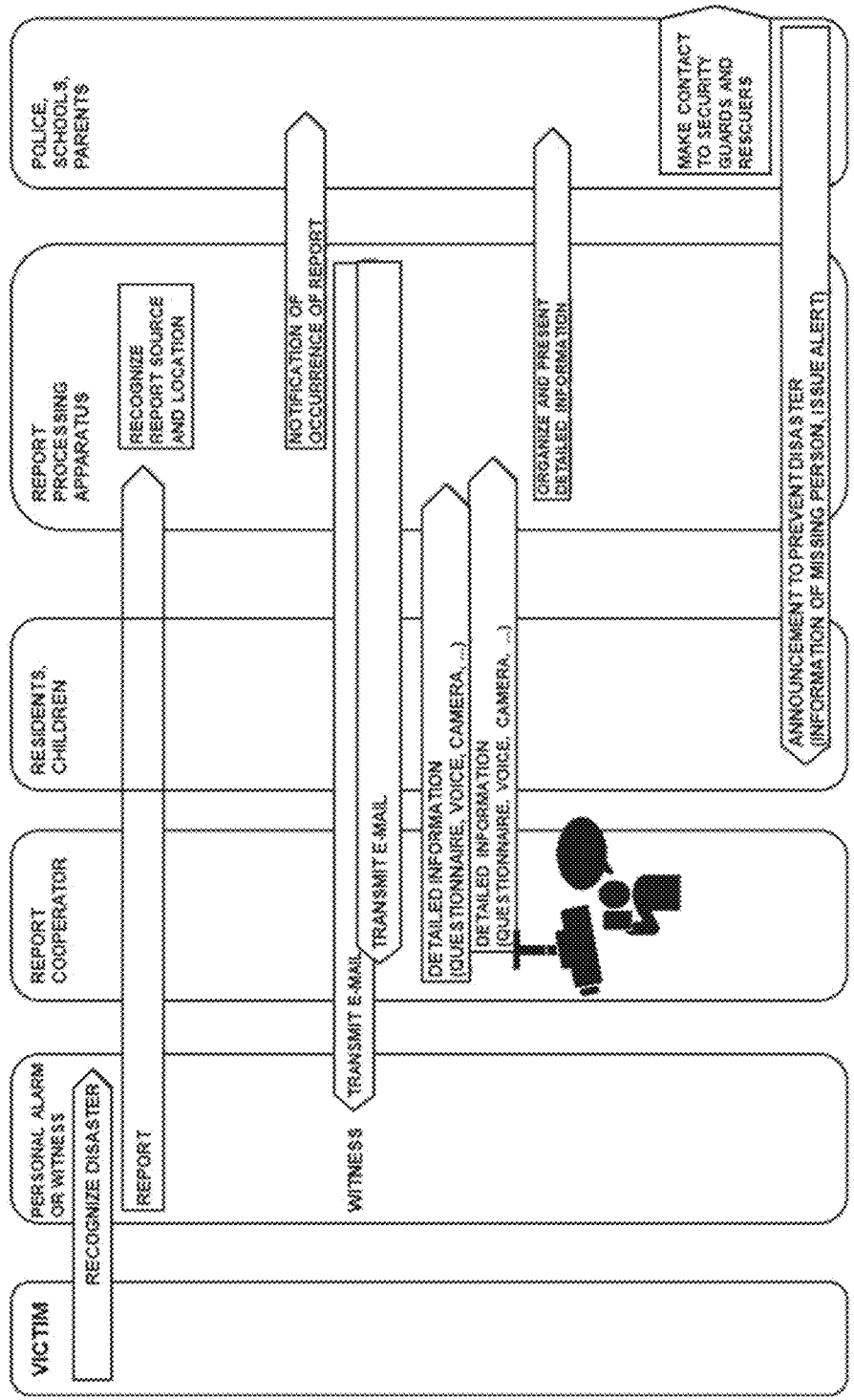
FIG. 10 is a diagram illustrating an example assuming a neighborhood watch as another example.

FIG. 10 is a diagram illustrating an example assuming a neighborhood watch as another example. In the example illustrated in FIG. 10, a witness as a third party who has seen a victim, a child, or an elderly person being in trouble transmits the first report information to the report processing apparatus 100 by using the terminal apparatus. The person in trouble himself/herself transmits the first report information to the report processing apparatus 100 by making a personal alarm (terminal apparatus) having a communication function make sound. The report processing apparatus 100 checks identity information and analyzes location information, based on the first report information, and transmits the information related to the first report information to the nearby communication terminals located near the victim. In this manner, a request of cooperation to people who are present near the victim can be made. The cooperator transmits detailed information (the second report information) to the report processing apparatus 100 in the form of data such as voice, a camera, and a video by using the nearby communication terminal. The information related to the second report information is, for example, provided for security guards and rescuers. Note that the information related to the first report information and the second report information may be provided for family members of the victim, the child, the elderly person, and the like.

In addition to the above, the report processing apparatus 100 can be applied to making a request of assistance to surrounding people (assistance of lifting up a baby carriage at places such as with stairs or steps, assistance of moving a wheelchair, and the like) as well.

The report processing apparatus 100 can also be applied to the commercial field. Specifically, the report processing apparatus 100 can be applied when there is a sale at a store for a limited time, when there are many vacant seats in a movie theater or the like, or when announcement with a coupon is to be issued to the nearby communication terminals, for example.

Specifically, as described above, the terminal apparatus carried or owned by a person who desires to perform announcement and advertisement may transmit the information related to the first report information to the nearby communication terminals via the report processing apparatus 100. In this case, by combining information obtained from the acceleration sensor incorporated in the terminal apparatus and the like, it can be arranged that such a message (the information related to the first report information) is not transmitted to passengers on a car, a bus, a train, and the like traveling nearby. In particular, with the use of learning-type artificial intelligence (AI), filtering of transmission destinations of the information of the first report information may be performed according to personal preference, based on information stored in the storage unit 120 of the report processing apparatus 100 or the like.

4. Second Example Embodiment

Next, with reference to FIG. 11, a second example embodiment of the present invention will be described. The first example embodiment described above is a specific example embodiment, whereas the second example embodiment is a more generalized example embodiment.

<4.1. Configuration of Report Processing Apparatus>

Figure 11:
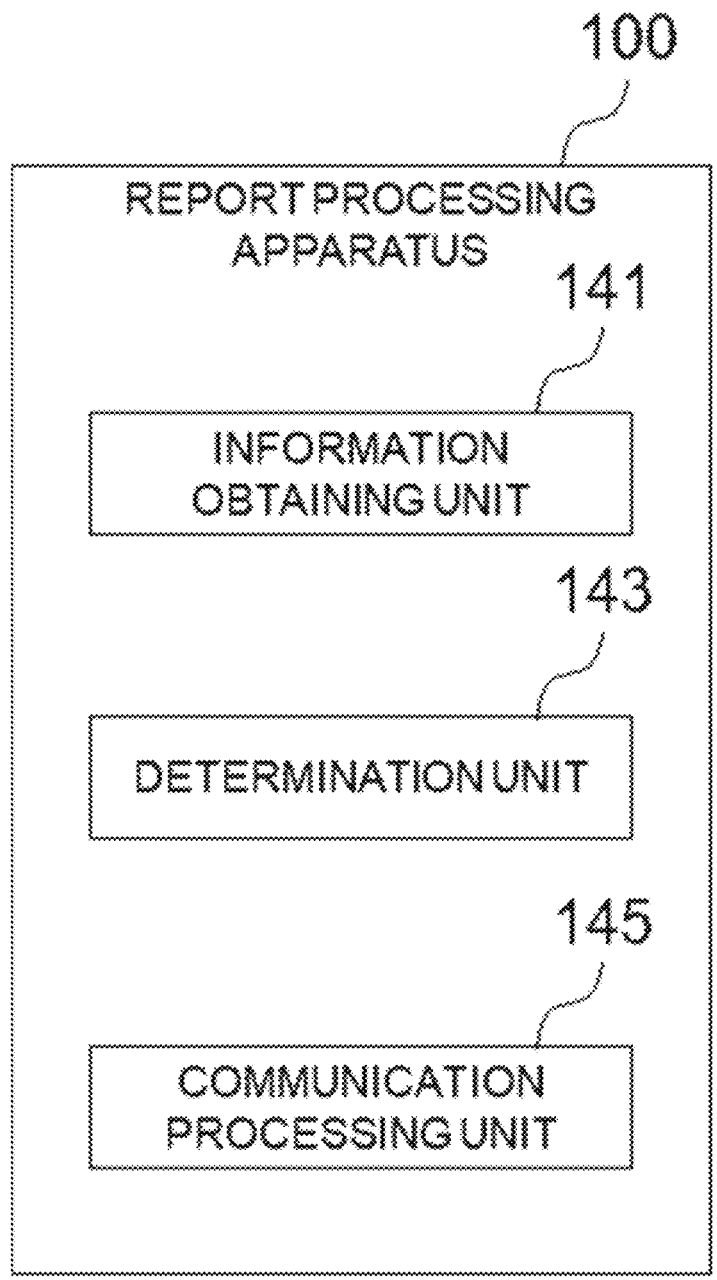
FIG. 11 is a diagram illustrating an overall configuration of a report processing apparatus 100 according to a second example embodiment.

FIG. 11 is a diagram illustrating an overall configuration of a report processing apparatus 100 according to the second example embodiment. With reference to FIG. 11, the report processing apparatus 100 includes an information obtaining unit 141, a determination unit 143, and a communication processing unit 145.

<4.2. Technical Features>

The report processing apparatus 100 (information obtaining unit 141) obtains first report information that is reported from the terminal apparatus with respect to a target event. Then, the report processing apparatus 100 (determination unit 143) determines one or more report destinations associated with the target event from a plurality of candidate report destinations, based on the first report information. Then, the report processing apparatus 100 (communication processing unit 145) transmits information related to the first report information to the one or more report destinations associated with the first report information.

The information obtaining unit 141 may perform operation the same as the operation of the information obtaining unit 131 according to the first example embodiment described above. The determination unit 143 may perform operation the same as the operation of the determination unit 133 according to the first example embodiment described above. The communication processing unit 145 may perform operation the same as the operation of the communication processing unit 135 according to the first example embodiment described above.

According to the report processing apparatus 100 including the configurations as described above, for example, when an event to be reported occurs, information related to the event can be appropriately reported.

5. Terminal Apparatus

In the first and second example embodiments, the terminal apparatus, the nearby communication terminal, and the nearby device is each a user equipment (UE) (or including a mobile station, a mobile terminal, a mobile device, a wireless device, or the like) as described below.

First, the user equipment (UE) (or including a mobile station, a mobile terminal, a mobile device, a wireless device, or the like) is an entity that is connected to a network via a radio interface.

The UE in the Specification is not limited to a dedicated communication apparatus, and may be any device as described below that has a communication function as the UE described in the Specification.

As for terms, each of the "user terminal (user equipment (UE)) as a term used in the 3rd Generation Partnership Project (3GPP)", the "mobile station", the "mobile terminal", the "mobile device", and the "wireless device" is generally intended to have the same meaning as each other, and may be a stand-alone mobile station such as a terminal, a mobile phone, a smartphone, a tablet, a cellular IoT terminal, or an IoT device.

Note that it is understood that the "UE" and the "wireless device" used as terms also encompass apparatuses that are stationary for a long period of time.

Further, for example, the UE may be a production facility/a manufacturing facility and/or an energy related device (examples of which include a boiler, an engine, a turbine, a solar panel, a wind power generator, a hydroelectric power plant, a thermal power plant, a nuclear power plant, a storage battery, a nuclear system, a nuclear related device, a heavy electric device, a pump including a vacuum pump and the like, a compressor, a fan, an air blower, a hydraulic device, a pneumatic device, a metalworking device, a manipulator, a robot, a robot applied system, a mechanical tool, a die, a roll, a convey apparatus, an elevating apparatus, a freight handling apparatus, a textile device, a sewing device, a printer, a printing related device, a paper processing device, a chemical device, a mining device, a mining related device, a construction device, a construction related device, an agricultural device and/or instrument, a forestry device and/or instrument, a fishery device and/or instrument, a safety and/or environmental preservation instrument, a tractor, a bearing, a precise bearing, a chain, a gear, a power transmission apparatus, a lubrication apparatus, a valve, a pipe joint, and/or an application system of any device or equipment described in the above, or the like).

Further, the UE may be, for example, an apparatus for transport (examples of which include a vehicle, an automobile, a two-wheeled vehicle, a bicycle, a train, a bus, a handcart, a rickshaw, a ship and other watercraft, an airplane, a rocket, an artificial satellite, a drone, a hot air balloon, and the like).

Further, the UE may be, for example, an apparatus for information communication (examples of which include an electronic computer and its related apparatus, a communication apparatus and its related apparatus, an electronic component, and the like).

Further, the UE may be, for example, a freezer, a freezer applied product and apparatus, a device for commercial and service use, a vending machine, an automatic service machine, a device and apparatus for business use, an electric and electronic device and instrument for consumer use (examples of which include an audio device, a speaker, a radio, an image device, a television, a microwave oven, a rice cooker, a coffee maker, a dishwashing machine, a laundry machine, a dryer, a fan, a ventilating fan and its related product, a vacuum cleaner, and the like).

Further, the UE may be, for example, an electronic applied system or an electronic applied apparatus (examples of which include an X-ray apparatus, a particle accelerating apparatus, a radioactive substance applied apparatus, an acoustic wave applied apparatus, an electromagnetic applied apparatus, an electric power applied apparatus, and the like).

Further, the UE may be, for example, a light bulb, a lighting, a weighing machine, an analysis device, a testing machine and a measuring device (examples of which include a smoke alarm, a human alarm sensor, a motion sensor, a wireless tag, and the like), a timepiece (a watch or a clock), a physical and chemical device, an optical device, a medical device and/or a medical system, a weapon, a sharp artisan tool, a hand tool, and the like.

Further, the UE may be, for example, a personal digital assistant or apparatus having a radio communication function (examples of which include an electronic apparatus (for example, a personal computer, an electronic measuring device, or the like) allowing attachment or insertion of a wireless card, a wireless module, or the like).

Further, the UE may be, for example, an apparatus or a part of the apparatus that provides the following application, service, or solution in the "Internet of things (IoT)" using a wired or wireless communication technology.

An IoT device (or a thing) includes an appropriate electronic device, software, a sensor, network connection, or the like that enables data collection and data exchange between the devices or between the device and another communication device.

Further, the IoT device may be an automated device that follows software commands that are stored in an internal memory.

Further, the IoT device may operate without the need of human supervision or handling.

Further, the IoT device may be an apparatus that is installed for a long period of time and/or may remain in an inactive state for a long period of time.

Further, the IoT device may be implemented as a part of a stationary apparatus. The IoT device may be embedded into a non-stationary apparatus (for example, a vehicle or the like), or may be attached to an animal or a person that is monitored/tracked.

It should be understood that the IoT technology can be implemented in any communication device that can be connected to a communication network for transmitting and receiving data, regardless of control with human input or software commands stored in the memory.

It should be understood that the IoT device may also be referred to as a machine type communication (MTC) device, a machine to machine (M2M) communication device, or a narrow band-IoT (NB-IoT) UE.

Further, it should be understood that the UE can support one or a plurality of IoT or MTC applications.

FIG. 12 is a diagram illustrating some examples of MTC applications. Specifically, some examples of the MTC applications are listed in a table as illustrated in FIG. 12, for example, which is disclosed in Annex B of Ref. 1 described below (the contents of which are incorporated in the Specification by reference).

[Ref 1] 3GPP TS 22.368 V13.2.0 (Upload date: Jan. 13, 2017)

The list is not comprehensive, and is to illustrate the MTC applications as an example.

Examples of the application, the service, and the solution may include a mobile virtual network operator (MVNO) service/system, a disaster prevention radio service/system, a private branch exchange (PBX) service/system, a PHS/digital cordless telephone service/system, a point of sale (POS) system, an advertisement distribution service/system, a multicast (multimedia broadcast and multicast service (MBMS)) service/system, a vehicle to everything (V2X) (vehicle to vehicle communication, and road to vehicle or pedestrian to vehicle communication) service/system, a train mobile radio service/system, a location information-related service/system, a disaster/emergency radio communication service/system, an Internet of things (IoT) service/system, a community service/system, a video distribution service/system, a femtocell applied service/system, a voice over LTE (VoLTE) service/system, a wireless TAG service/system, a charging service/system, a radio on demand service/system, a roaming service/system, a user behavior monitoring service/system, a communication carrier/communication NW selection service/system, a function limiting service/system, a proof of concept (PoC) service/system, a personal information management service/system for a terminal, a display and image service/system for a terminal a non-communication service/system for a terminal, an ad hoc NW/delay tolerant networking (DTN) service/system, and the like.

Note that the categories of the UE described above are merely some application examples of the technical concept and the example embodiments described in the Specification. These examples are not restrictive, and as a matter of course, those of ordinary skill in the art can make various modifications.

6. Other Modes

Descriptions have been given above of the example embodiments of the present invention. However, the present invention is not limited to these example embodiments. It should be understood by those of ordinary skill in the art that these example embodiments are merely examples and that various alterations are possible without departing from the scope and the spirit of the present invention.

For example, the steps in the processing described in the Specification may not necessarily be carried out in time series in the order described in the corresponding sequence diagram. For example, the steps in the processing may be carried out in an order different from that described in the corresponding sequence diagram or may be carried out in parallel. Some of the steps in the processing may be deleted, or more steps may be added to the processing.

An apparatus including constituent elements (e.g., the information obtaining unit, the determination unit, and/or the communication processing unit) of the report processing apparatus described in the Specification (e.g., one or more apparatuses (or units) among a plurality of apparatuses (or units) constituting the report processing apparatus or a module for one of the plurality of apparatuses (or units)) may be provided. Moreover, methods including processing of the constituent elements may be provided, and programs for causing a processor to execute processing of the constituent elements may be provided. Moreover, non-transitory computer readable recording medium (non-transitory computer readable medium) having recorded thereon the programs may be provided. It is apparent that such apparatuses, modules, methods, programs, and non-transitory computer readable recording media are also included in the present invention.

The whole or part of the example embodiments disclosed above can be described as, but not limited to, the following supplementary notes.

(Supplementary Note 1)

A report processing apparatus comprising:

an information obtaining unit configured to obtain first report information reported from a terminal apparatus with respect to a target event;

a determination unit configured to determine one or more report destinations associated with the target event from a plurality of candidate report destinations based on the first report information; and a communication processing unit configured to transmit information related to the first report information to the one or more report destinations associated with the first report information.

(Supplementary Note 2)

The report processing apparatus according to supplementary note 1, wherein the determination unit is configured to determine one or more report destinations whose relevance to the target event meets a predetermined condition from the plurality of candidate report destinations, based on the first report information.

(Supplementary Note 3)

The report processing apparatus according to supplementary note 1, further comprising an analysis unit configured to analyze a location of the terminal apparatus based on the first report information, wherein the determination unit is configured to determine one or more report destinations associated with the target event from the plurality of candidate report destinations based on the location of the terminal apparatus.

(Supplementary Note 4)

The report processing apparatus according to supplementary note 3, wherein the one or more report destinations associated with the target event are one or more radio communication apparatuses located in a predetermined neighborhood area from the location of the terminal apparatus in a radio access network.

(Supplementary Note 5)

The report processing apparatus according to supplementary note 3 or 4, wherein the communication processing unit is configured to receive second report information reported with respect to the target event from the one or more report destinations located in the predetermined neighborhood area from the location of the terminal apparatus.

(Supplementary Note 6)

The report processing apparatus according to supplementary note 5, wherein the information related to the first report information includes information for requesting the second report information.

(Supplementary Note 7)

The report processing apparatus according to any one of supplementary notes 1 to 6, wherein the first report information includes information related to an event type corresponding to the target event from two or more event types.

(Supplementary Note 8)

The report processing apparatus according to any one of supplementary notes 1 to 7, wherein the first report information includes location information of the terminal apparatus.

(Supplementary Note 9)

The report processing apparatus according to any one of supplementary notes 1 to 8, wherein the first report information includes acceleration information of the terminal apparatus.

(Supplementary Note 10)

A report processing method comprising:

obtaining first report information reported from a terminal apparatus with respect to a target event;

determining one or more report destinations associated with the target event from a plurality of candidate report destinations based on the first report information; and transmitting information related to the first report information to the one or more report destinations associated with the first report information.

(Supplementary Note 11)

A program that causes a processor to execute:

obtaining first report information reported from a terminal apparatus with respect to a target event;

determining one or more report destinations associated with the target event from a plurality of candidate report destinations based on the first report information; and transmitting information related to the first report information to the one or more report destinations associated with the first report information.

(Supplementary Note 12)

A non-transitory computer readable recording medium storing a program that causes a processor to execute:

obtaining first report information reported from a terminal apparatus with respect to a target event;

determining one or more report destinations associated with the target event from a plurality of candidate report destinations based on the first report information; and transmitting information related to the first report information to the one or more report destinations associated with the first report information.

This application claims priority based on JP 2018-218528 filed on Nov. 21, 2018, the entire disclosure of which is incorporated herein.

INDUSTRIAL APPLICABILITY

When an event to be reported occurs, information related to the event can be appropriately reported.

REFERENCE SIGNS LIST

1 System
100 Report processing apparatus
131, 141 Information obtaining unit
133, 143 Determination unit
135, 145 Communication processing unit
137 Analysis unit
201, 202, 203, 204 Terminal apparatus
401, 402, 403, 404, 405 Report destination apparatus

What is claimed is:

1. A report processing apparatus comprising:
a memory storing instructions; and
one or more processors configured to execute the instructions to:
obtain first report information reported from a terminal apparatus with respect to a target event;
determine one or more report destinations associated with the target event from a plurality of candidate report destinations based on the first report information, the one or more report destinations associated with the target event being one or more radio communication apparatuses located in a predetermined neighborhood area from a location of the terminal apparatus in a radio access network;
transmit information related to the first report information to the one or more report destinations; and
receive second report information from the one or more report destinations,
wherein the information related to the first report information includes information for requesting the second report information, an area to which the information related to the first report information is transmitted is dependent on an importance of the target event, the second report information is obtained from the one or more report destinations in response to the first report information, and the one or more processors are configured to execute the instructions to determine an appropriate report destination based on the second report information.

2. The report processing apparatus according to claim 1, wherein the one or more processors are configured to execute the instructions to determine the one or more report destinations having relevance to the target event that meets a predetermined condition, from the plurality of candidate report destinations, based on the first report information.

3. The report processing apparatus according to claim 1, wherein the one or more processors are configured to execute the instructions to:

analyze the location of the terminal apparatus based on the first report information, and determine the one or more report destinations associated with the target event from the plurality of candidate report destinations based on the location of the terminal apparatus.

4. The report processing apparatus according to claim 3, wherein the one or more processors are configured to execute the instructions to receive the second report information reported with respect to the target event from the one or more report destinations located in the predetermined neighborhood area from the location of the terminal apparatus.

5. The report processing apparatus according to claim 1, wherein the first report information includes information related to an event type corresponding to the target event from two or more event types.

6. The report processing apparatus according to claim 1, wherein the first report information includes location information of the terminal apparatus.

7. The report processing apparatus according to claim 1, wherein the first report information includes acceleration information of the terminal apparatus.

8. A report processing method comprising:

obtaining first report information reported from a terminal apparatus with respect to a target event;

determining one or more report destinations associated with the target event from a plurality of candidate report destinations based on the first report information, the one or more report destinations associated with the target event being one or more radio communication apparatuses located in a predetermined neighborhood area from a location of the terminal apparatus in a radio access network; and transmitting information related to the first report information to the one or more report destinations; and receiving second report information from the one or more report destinations, wherein the information related to the first report information includes information for requesting the second report information, an area to which the information related to the first report information is transmitted is dependent on an importance of the target event, the second report information is obtained from the one or more report destinations in response to the first report information, and the one or more processors are configured to execute the instructions to determine an appropriate report destination based on the second report information.

9. A non-transitory computer readable recording medium storing a program that causes a processor to execute:

obtaining first report information reported from a terminal apparatus with respect to a target event;

determining one or more report destinations associated with the target event from a plurality of candidate report destinations based on the first report information, the one or more report destinations associated with the target event being one or more radio communication apparatuses located in a predetermined neighborhood area from a location of the terminal apparatus in a radio access network; and transmitting information related to the first report information to the one or more report destinations, and receiving second report information from the one or more report destinations, wherein the information related to the first report information includes information for requesting the second report information, an area to which the information related to the first report information is transmitted is dependent on an importance of the target event, the second report information is obtained from the one or more report destinations in response to the first report information, and the one or more processors are configured to execute the instructions to determine an appropriate report destination based on the second report information.

* * * * *